United States Patent Office 3,492,242
Patented Jan. 27, 1970

3,492,242
CHEMICAL DEFOAMING COMPOSITION
Leroy L. Carney and Gerald G. Priest, Houston, Tex., assignors to Dixie Chemical Products Co., Houston, Tex., a corporation of Texas
No Drawing. Filed Nov. 30, 1966, Ser. No. 597,873
Int. Cl. B01d 19/04
U.S. Cl. 252—358                                       2 Claims

ABSTRACT OF THE DISCLOSURE

A chemical composition useful as a defoaming agent. Particularly effective in defoaming raw sulfite liquor during conversion to chrome lignosulfonate. The defoamer composition comprises a mixture of aluminum stearate and one or more $C_{12}$ to $C_{28}$ aliphatic, preponderantly normal alcohols slurried in an organic solvent-dispersant such as kerosene to yield a fluid mixture having a solids content (the stearate and alcohols being solid under ambient condition) of between about 20% to 80%. According to present data mixture should preferably yield about 40% by weight solids.

BACKGROUND OF THE INVENTION

Field of the invention

This invention pertains to chemicals which may be used as defoaming agents in chemical processes.

Description of the prior art

A wide variety of chemicals and chemical compositions are now known to have properties which make them useful as defoaming agents. Perhaps, chief among these are various of the surface active materials which will increase surface and interfacial tension. The chemicals and compounds now known to exhibit defoaming properties vary in effectiveness with the environment of application. There is not any defoamer of universal application and those which have heretofore been used in sulfite liquors are expensive and not fully effective. As new processes evolve new agents must normally be sought. Many of the known commercially applied agents are not fully effective. New and better agents are continuously being sought.

SUMMARY OF THIS INVENTION

This invention is a new defoaming composition. It comprises a liquid solvent in which aluminum stearate and one or more $C_{12}$ to $C_{28}$ aliphatic alcohols are dispersed. A solvent, aluminum stearate and $C_{17}$ and $C_{24}$ alcohol combination is, so far as applicants can determine, novel. Laboratory data shows the composition to be of general application. Commercially, it is particularly effective in defoaming raw sulfite liquor during its conversion to chrome lignosulfonate. Applicants' assignee is now using this defoamer with excellent effect in practicing the invention of U.S. Letters Patent No. 2,935,473 to commerically produce chrome lignosulfonate from raw sulfite liquor. This defoamer is also effective in defoaming other lignin containing solutions and suspensions or dispersions treated with lignosulfonates.

BRIEF DESCRIPTION OF THE PREFERRED EMBODIMENT

Present data show the preferred embodiment to be formulated as follows:

|  | Weight percent |
|---|---|
| Aluminum stearate | 50 |
| $C_{12}$ to $C_{28}$ alcohols | 50 |
| Total | 100 |

This stearate-alcohol mixture is slurried in kerosense to yield a final mixture containing about 40% solids by weight. That is to say 40% by weight of the stearate-alcohol mix since both the stearate and the alcohol are solid under ambient conditions.

The kerosene solvent may be substituted. Present data indicate that many of the well known commercial solvents may be employed. Naphtha and diesel oil have been found satisfactory. Sufficient solvent must be used to achieve good dispersion of the defoamer in the processing environment. The data also indicate that twenty percent solvent is the probable minimum effective concentration and that more than eighty percent becomes observably inefficient.

In tests and application, to date, the stearate-alcohol combination has exhibited a synergistic effect. While a 50–50 stearate to alcohol ratio is preferred tests also show that this ratio may be varied from 20–80 to 80–20 before significant loss of effect occurs.

In actual commercial practice the effect achieved is remarkably good. For example, addition of two gallons of the same defoamer formulation added to 5,000 gallons of liquor carrying a 1,800 gallon foam head three feet in height completely eliminates the foam head even while the liquor is under agitation.

Tests conducted to compare the stearate with the combination and the alcohol with the combination showed each to be effective. The combination was, however, significantly more effective than either the stearate or the alcohol taken alone.

We claim:
1. A defoaming agent composition consisting essentially of:
   a fluid organic solvent;
   aluminum stearate; and
   at least one normal aliphatic alcohol having a chain length of from about $C_{12}$ to $C_{28}$, said alcohol and said stearate being dispersed in said solvent in an amount of from about 20 to about 80 weight percent of said stearate-alcohol mixture, the stearate to alcohol ratio being from about 1:4 to 4:1.
2. The composition of claim 1 wherein said solvent comprises kerosene.

References Cited

UNITED STATES PATENTS

| 1,957,514 | 5/1934 | Wolfson | 252—321 X |
| 2,338,613 | 1/1944 | Zimmer | 252—321 X |

RICHARD D. LOVERING, Primary Examiner

U.S. Cl. X.R.
252—8.5, 321